Figure 1:
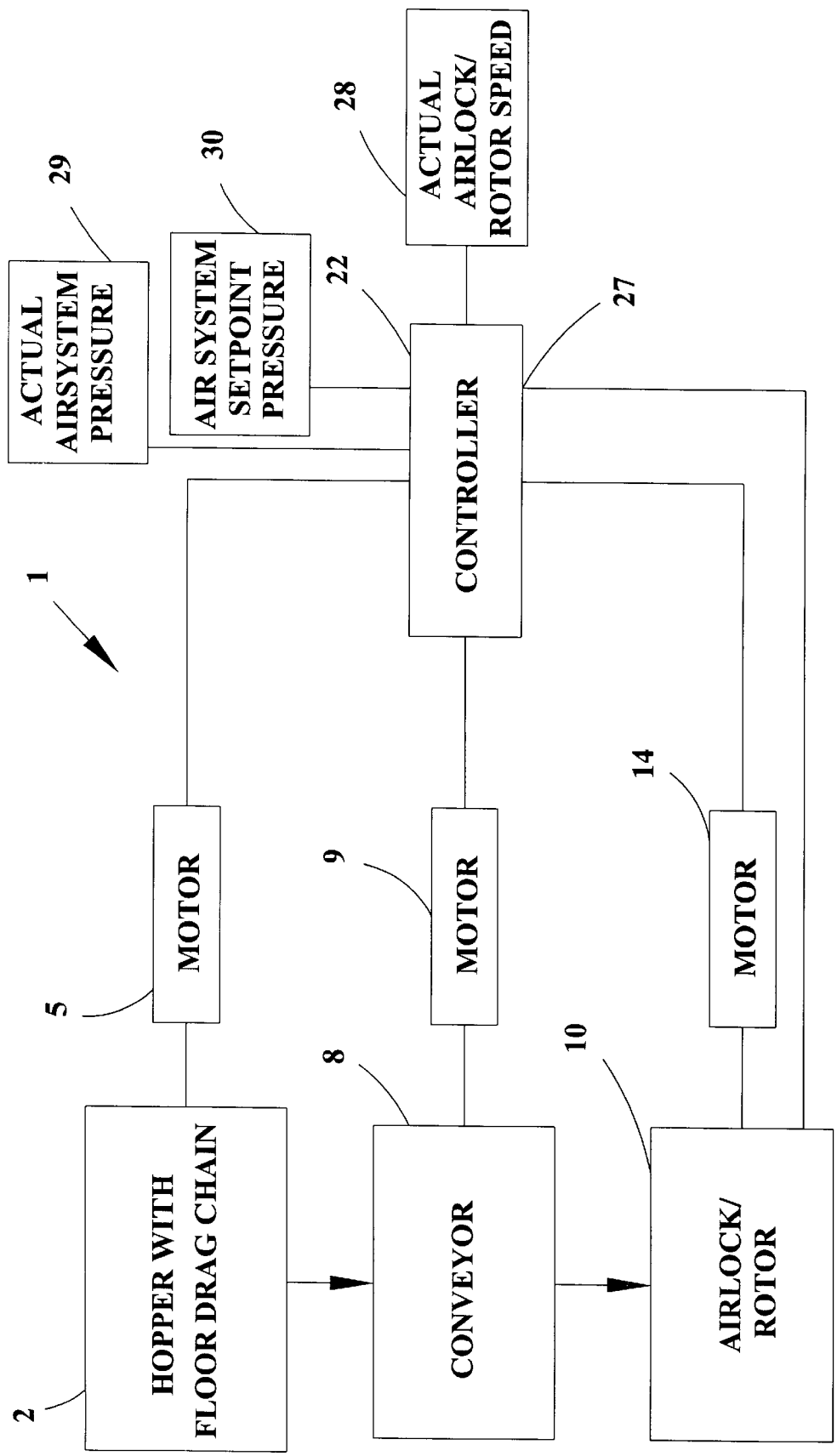
Figure 2:
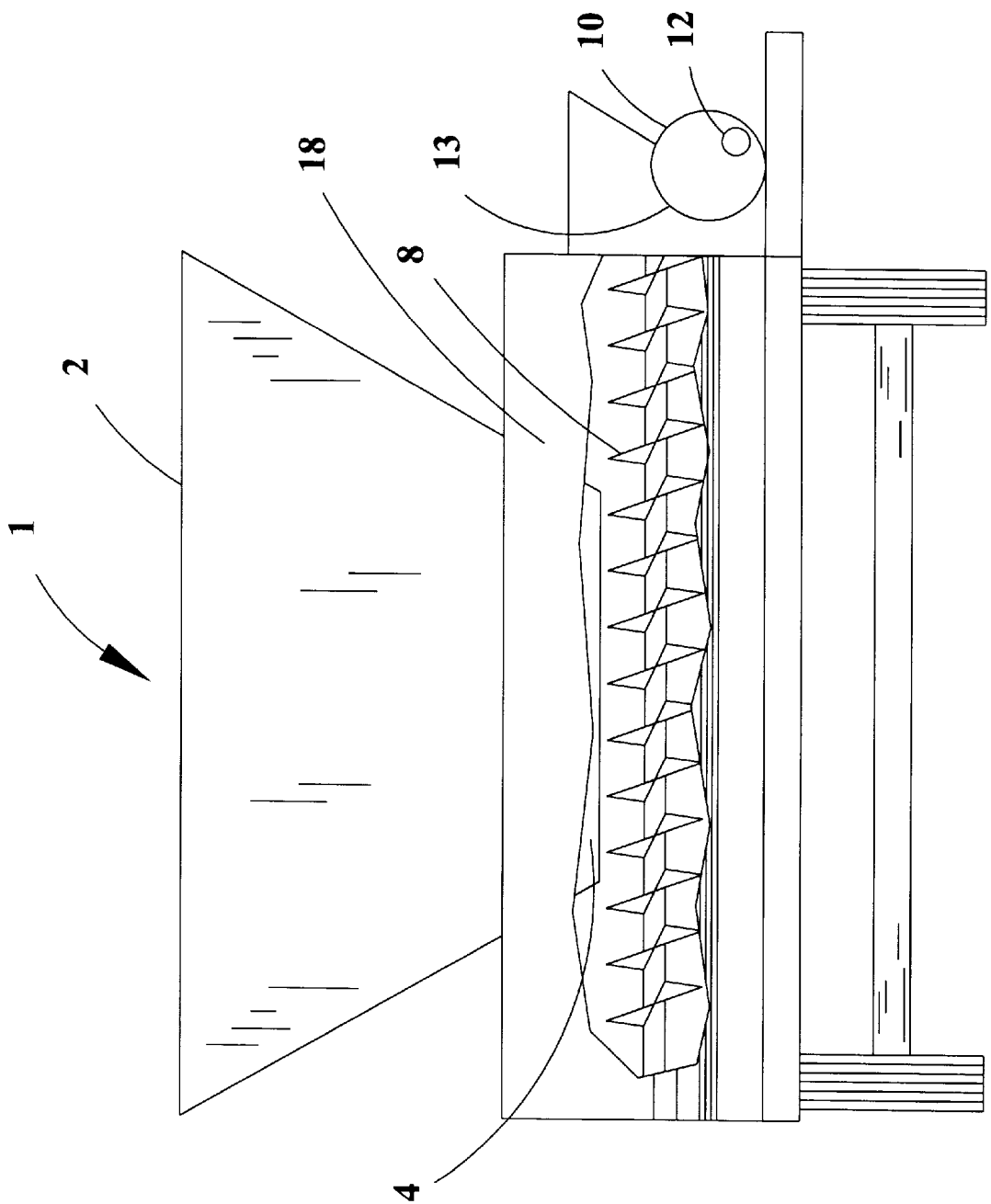
Figure 3:
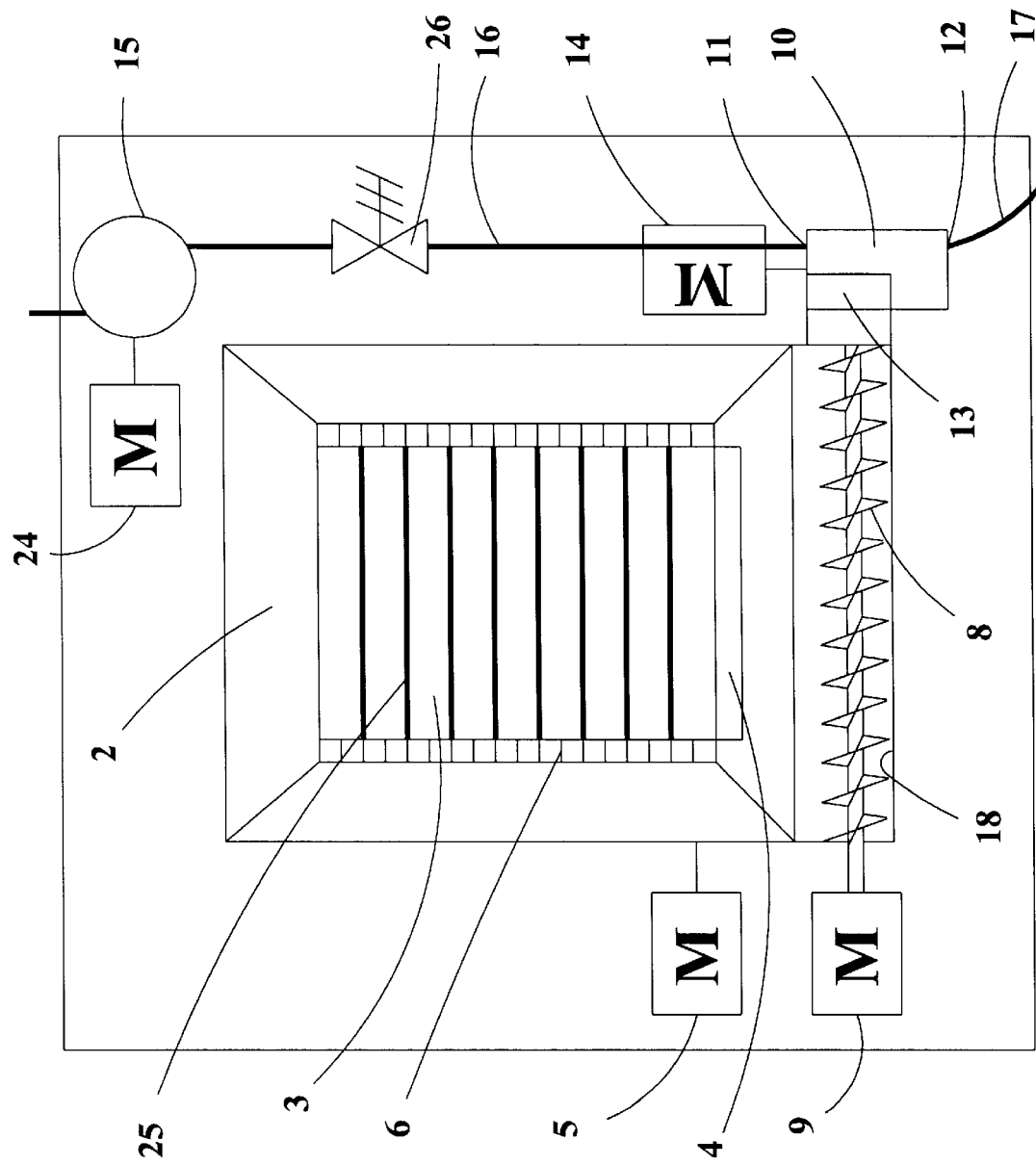
Figure 4:
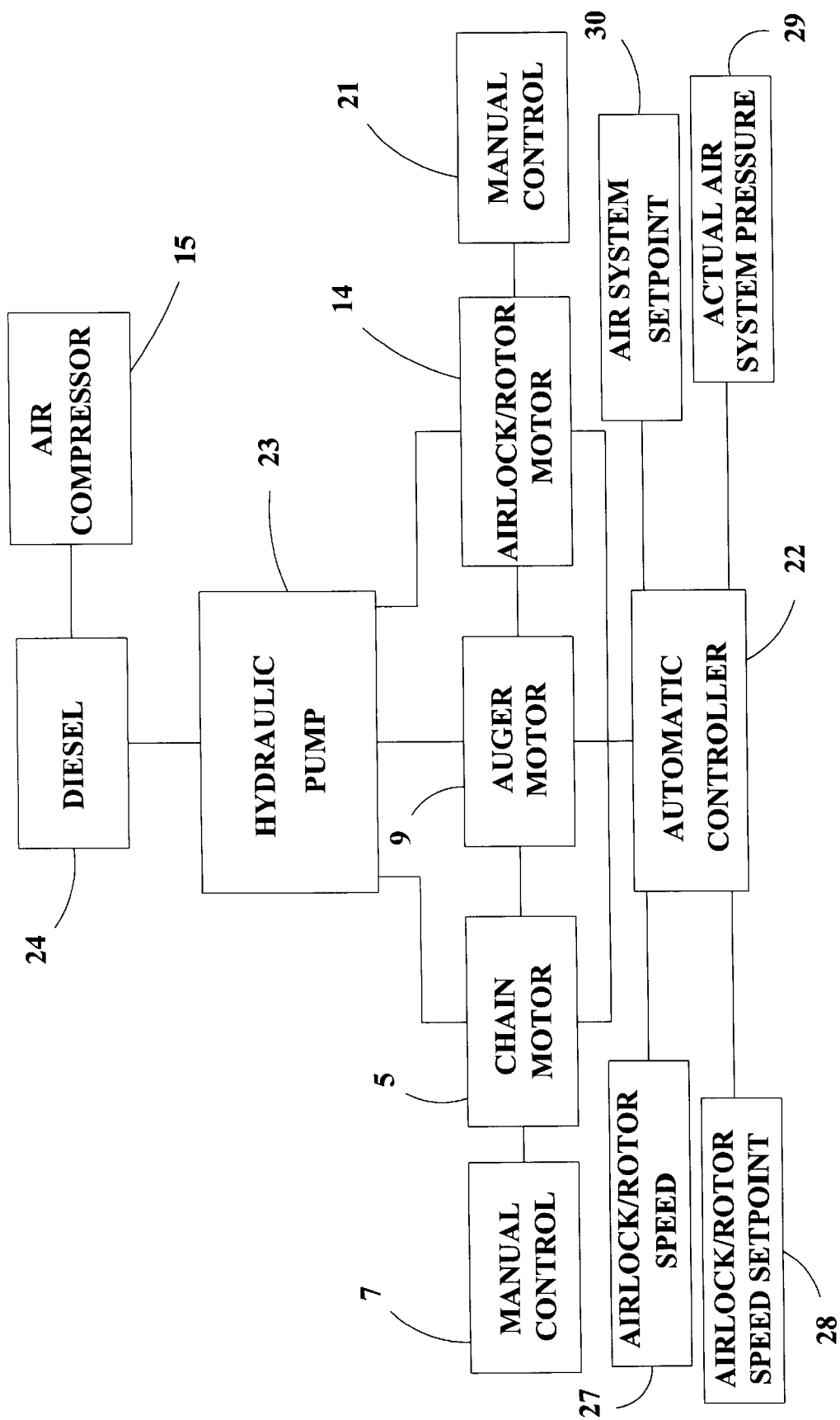

United States Patent [19]
White

[11] Patent Number: 6,131,818
[45] Date of Patent: Oct. 17, 2000

[54] COMPOSTED WASTE SPREADING APPARATUS AND METHOD

[76] Inventor: Harvey C. White, 208 Kensington Park, Nashville, Tenn. 37215

[21] Appl. No.: 09/368,436

[22] Filed: Aug. 4, 1999

[51] Int. Cl.[7] .............................. A01C 3/06; A01C 19/00; E01C 19/00
[52] U.S. Cl. .............................. 239/8; 239/654; 239/655; 239/672; 239/675; 239/677
[58] Field of Search .................. 239/8, 77, 650, 239/654, 655, 672, 675, 677

[56] References Cited

U.S. PATENT DOCUMENTS

| | | |
|---|---|---|
| 3,997,118 | 12/1976 | Bedwell et al. ..................... 239/675 X |
| 4,575,010 | 3/1986 | Zimmerman ........................ 239/675 X |
| 4,767,062 | 8/1988 | Fletcher ................................ 239/655 |
| 4,852,809 | 8/1989 | Davis et al. . |
| 5,028,009 | 7/1991 | Takata . |
| 5,052,627 | 10/1991 | Balmer . |
| 5,074,473 | 12/1991 | Bauer . |
| 5,092,526 | 3/1992 | Takata . |
| 5,178,333 | 1/1993 | Barber et al. . |
| 5,485,962 | 1/1996 | Moss . |
| 5,725,160 | 3/1998 | Harper et al. . |
| 5,725,332 | 3/1998 | Harper et al. . |
| 5,775,585 | 7/1998 | Duello . |
| 5,931,393 | 9/1999 | Alsip et al. ............................. 239/654 |

*Primary Examiner*—Andres Kashnikow
*Assistant Examiner*—Robin O. Evans
*Attorney, Agent, or Firm*—Woodling, Krost and Rust

[57] ABSTRACT

A composted waste spreading (distributing) method and apparatus is disclosed. A storage hopper having a floor drag chain is employed to remove the composted material from the bottom of the hopper and push it out of the hopper through an opening. A unidirectional conveyor pushes the composted material into an air supplied airlock. The airlock has a flexible air conduit connected thereto for distributing the composted waste which is entrained into the airstream passing through the airlock under the force of a compressor. The airlock, conveyor and floor chain are driven by hydraulic motors and are either controlled manually or alternatively by an automatic controller.

19 Claims, 6 Drawing Sheets

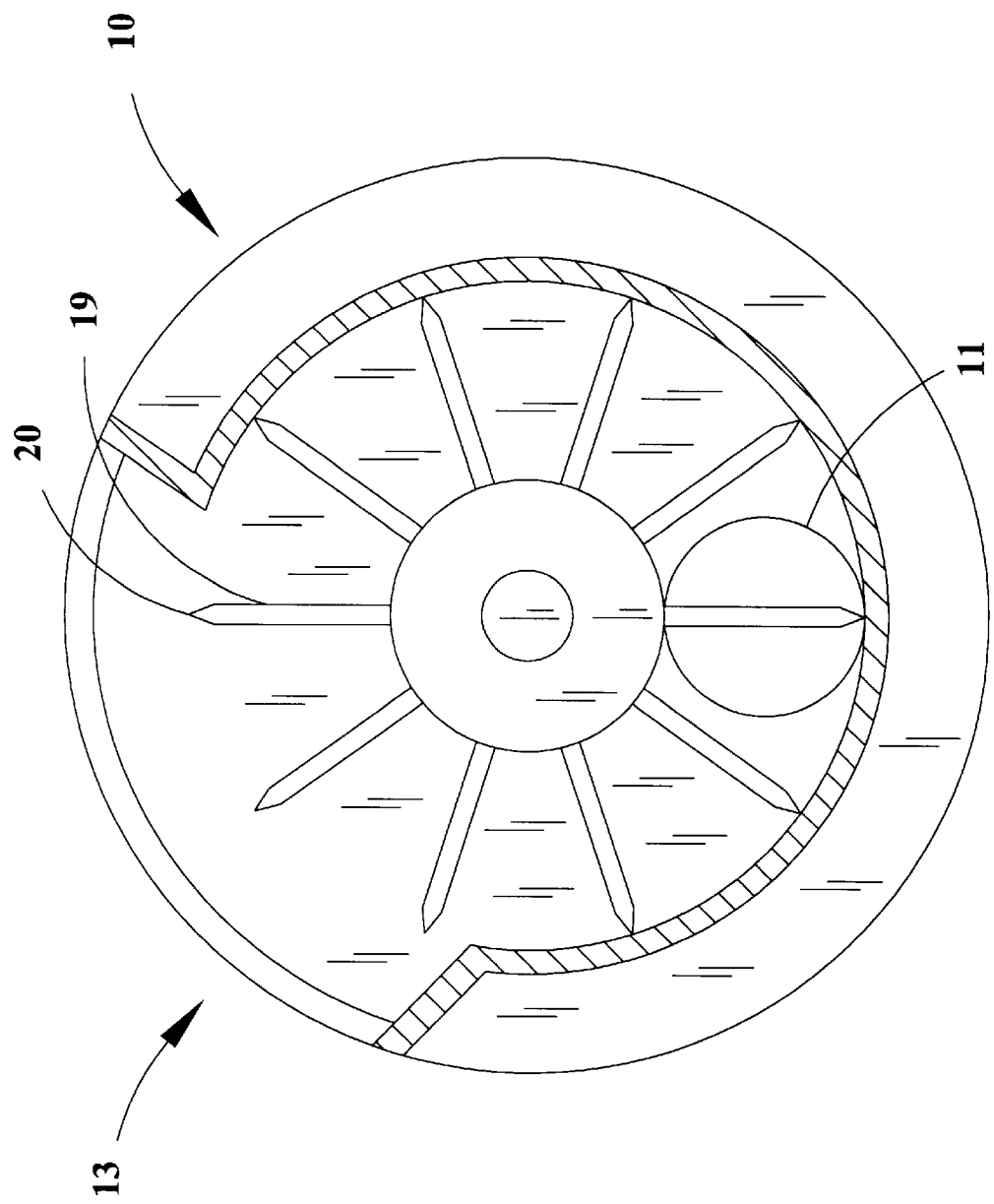

```
┌─────────────────────────────────────────────┐
│   PLACING THE COMPOSTED WASTE               │
│   INTO A STORAGE HOPPER                     │
└─────────────────────────────────────────────┘
                      │
┌─────────────────────────────────────────────┐
│   DRAGGING COMPOSTED WASTE FROM THE         │
│   BOTTOM OF THE STORAGE HOPPER INTO         │
│   AND THROUGH AN OPENING IN THE STORAGE     │
│   HOPPER                                    │
└─────────────────────────────────────────────┘
                      │
┌─────────────────────────────────────────────┐
│   PUSHING BY MEANS OF A UNIDIRECTIONAL      │
│   CONVEYOR, THE COMPOSTED WASTE             │
│   INTO A MATERIAL INLET OF AN AIRLOCK       │
└─────────────────────────────────────────────┘
                      │
┌─────────────────────────────────────────────┐
│   PUMPING AIR INTO AND THROUGH THE AIRLOCK  │
│   WITH THE AIR COMPRESSOR AND AIR CONDUIT   │
└─────────────────────────────────────────────┘
                      │
┌─────────────────────────────────────────────┐
│   ROTATING THE AIRLOCK AND MEASURING THE    │
│   DESIRED SPEED SO AS TO ENTRAIN COMPOSTED  │
│   WASTE PASSING INTO AND THROUGH THE AIRLOCK│
│   INTO THE AIR                              │
└─────────────────────────────────────────────┘
                      │
┌─────────────────────────────────────────────┐
│   DISPERSING THE COMPOSTED WASTE ENTRAINED IN│
│   THE AIR INTO THE ENVIRONMENT              │
└─────────────────────────────────────────────┘
```

FIG. 6

COMPOSTED WASTE SPREADING APPARATUS AND METHOD

BACKGROUND OF THE INVENTION

The present invention relates to an apparatus and method for entraining composted waste into an airstream. The air stream is a high velocity airstream which enables spreading of composted waste in a location remote from the apparatus. Flexible air conduits several hundred (50 feet to 700 feet) feet long may be used to spread the composted waste. The long air conduit enables the spreading of compost to remote trees unreachable by mechanical equipment. By composted waste it is meant green waste (curb side pick up) and biosolid waste (dairy manure, chicken manure). Biosolid waste is also known as sewage sludge. The waste is not free flowing and is composted and dried before it is spread.

DESCRIPTION OF THE RELATED ART

U.S. Pat. No. 5,725,332 to Harper et al. discloses an airlock feeder apparatus. The airlock feeder apparatus is designed to more efficiently entrain solid material in a gas or air stream. This is done by means of the Bernoulli effect which is sometimes called eduction. Essentially, high pressure air is passed through inner channels of the airlock enabling the eduction of solid materials into the airstream. The '332 patent to Harper et al is related to U.S. Pat. No. 5,725,160 which is directed toward a chip blower apparatus. The '160 patent to Harper et al. discloses a hopper with an auger for directing materials to the bottom of the hopper. An airlock feeder adjacent to the bottom of the hopper receives the material therefrom.

The inventions of the '160 and '332 patents are directed toward an airlock feeder apparatus and a chip blower apparatus which pneumatically conveys and applies aggregate materials used in landscaping, playground, and other ground covering applications. Further, air entrainment of particulate solids such as aggregate materials including wood chips and engineered wood fiber, seeds, fertilizer, road surfacing materials, insulation, or other solid particular materials which can be pneumatically conveyed and applied are envisioned as materials for use in connection with the invention of the '332 patent.

Nowhere in either the '160 or the '332 patents is the problem of composted waste material addressed. Composted waste material is not free flowing. Accordingly, it is necessary that a floor drag chain be operated at a variable rate necessary to ensure that the proper amount of composted waste is delivered to the conveyor per unit of time so the conveyor may then supply the airlock apparatus with the desired rate of flow. The airlock feeder apparatus is operated at a variable speed controlled by the system pressure. In other words, the operator is applying the composted waste material over an area remote from the hopper and he or she determines whether or not the material is being spread adequately. This can be a function of the particular material being spread. The operator inserts into the control system a setpoint which is representative of air system pressure. The setpoint is in terms of the pressure of the air stream. Both high pressure for the overload and low pressure for under utilization of the system are measured and also inputted through an appropriate device to the controller. The pressure is measured upstream of the airlock/rotor. The conveyor is run at a constant speed but the speed of the hopper floor drag chain varies in response to the deviation between the pressure upstream of of the rotor/airlock and the setpoint pressure of the airstream. With the pressure of the airstream being less than the setpoint, a deviation or error signal would be sent by the controller and the controller would output a signal to the floor drag chain commanding it to speed up or supply more material to the conveyor. With the pressure of the airstream being greater than the setpoint then the signal would be for the floor drag chain to slow down. This enables the airlock/rotor to dispense the material presented to it at maximum capacity and provide for a smooth, continuous stream of entrained, composted waste to be spread at an area remote from the hopper.

SUMMARY OF THE INVENTION

A composted waste spreading apparatus which includes a hopper for storing the composted waste to be spread is disclosed. The hopper has a floor and there is an opening in the hopper. A drag chain is driven by a first hydraulic motor and propels slats which drag material in the direction of and into the opening in the hopper. The first hydraulic motor which powers the drag chain is a variable speed hydraulic motor. This hydraulic motor can be manually controlled by the operator or can alternatively be controlled by the automatic controller. A constant speed conveyor is driven by a second hydraulic motor. The constant speed conveyor feeds an airlock which has an air inlet, an air outlet and a material inlet. The conveyor feeds the material inlet of the airlock. An air compressor apparatus is connected to the air inlet of the airlock. The air outlet of the airlock has attached to it a lengthy air conduit. The length of the air conduit is variable and enables the spreading of the composted waste material over a remote area.

The airlock apparatus is driven by a third hydraulic motor. The third hydraulic motor is a variable speed hydraulic motor with a speed sensor which signals the airlock/rotor's instantaneous speed to the controller. The airlock includes a plurality of vanes which in the preferred embodiment are carbide tipped vanes. The airlock may be manually controlled or it may be automatically controlled by the automatic controller which continuously monitors the airlock/rotor's speed.

The automatic controller includes a setpoint for pressure in the airstream. A deviation or error is detected by the automatic controller based on the air pressure in the airstream and the desired (setpoint) pressure of the airstream. The signal or deviation is acted upon by the controller to either increase the speed of the floor drag chain or to decrease the speed of the floor drag chain and/or reverse the airlock rotation to clear possible blockage. The composted waste material is not free flowing and the speed of the floor drag chain meters the amount of composted waste material which is delivered to the constant speed conveyor. The constant speed conveyor then transports the material delivered to the airlock at a constant rate.

A method of distributing the composted waste material using a storage hopper having a floor and an opening, a drag chain on the floor of the storage hopper, a conveyor, an air compressor, and air outlet, and a material inlet, and flexible air conduits interconnected between the air compressor and the air inlet to the airlock and air outlet of the airlock and environment is also disclosed herein. Specifically, the steps of placing the composted waste into a storage hopper; dragging the composted waste with a drag chain from the bottom of the storage hopper into and through an opening in the storage hopper; pushing, by means of a unidirectional conveyor, said composted waste into a material inlet of an airlock; pumping air into and through said airlock with the air compressor and air conduit; and rotating the airlock at a desired speed so as to entrain composted waste in the air passing into and through the airlock; and dispersing the composted waste entrained in the air by means of an air conduit which communicates with the environment are all disclosed and claimed in this invention.

It is an object of the invention to provide a control system whereby the floor drag chain in the hopper may be controlled as necessary to supply composted waste. It is an object of this invention to provide a floor drag chain in a hopper so as to prevent bridging of the composted waste within the hopper.

It is an object of the invention to provide a control system which automatically controls the speed of the floor drag chain in response to an error signal or deviation between the desired speed of the airlock/rotor and the actual speed of the airlock/rotor.

It is the further object of the invention to provide a control system which detects the deviation between the actual speed of the airlock/rotor and the desired speed of the airlock/rotor and which shuts down or stops the floor drag chain and conveyor if the deviation between the actual desired speed of the airlock/rotor reaches a predetermined limit.

It is an object of the present invention to provide a composted waste spreading apparatus which is able to handle composted waste which is not free flowing.

It is a further object of the present invention to provide a composted waste spreading apparatus which has a floor drag chain operable at a variable speed, a conveyor operable at a constant speed, and an airlock operable at a variable speed.

It is an object of the present invention to employ a programmable controller to control the waste spreading apparatus, specifically, to clear the airlock from a blocked condition in response to a deviation between the actual speed and the desired speed of the airlock/rotor.

It is an object of the invention to provide an analog controller which monitors the deviation between the actual desired speeds of the airlock/rotor and outputs a signal that is proportionally in response to the deviation or is proportionally and integrally in response to the deviation.

It is a further object of the present invention to have a controller operate on the deviation or error signal between an air system pressure setpoint and a measured air system pressure.

BRIEF DESCRIPTION OF THE DRAWINGS

FIG. 1 a diagrammatic representation of the control of the hydraulic motors which operate the floor drag chain, the conveyor and the airlock.

FIG. 2 is a rear view of the hopper, the conveyor, the intermediate supply bin, and the airlock.

FIG. 3 is a top view of the composted waste spreading apparatus illustrating diagrammatically the hopper, floor drag chain, conveyor, and air conduits and airlock.

FIG. 4 is a diagrammatic representation of the manual and automatic control of the hydraulic motors. FIG. 4 further illustrates a diesel powered air compressor.

FIG. 5 is a cross-sectional view of the airlock illustrating the carbide-tipped vanes and the air inlet.

FIG. 6 is a diagram of the novel process steps.

DESCRIPTION OF THE INVENTION

FIG. 1 is a diagrammatic representation of the control of the hydraulic motors which operate the floor drag chain 6, the conveyor 8 and the airlock 10. Specifically, FIG. 1 illustrates the hopper 2 with a floor drag chain, the conveyor 8, and the airlock/rotor 10. The first hydraulic motor 5 is a variable speed hydraulic motor and operates the floor drag chain. The second hydraulic motor 9 is a constant speed motor and operates the conveyor 8. The third hydraulic motor 14 is a variable speed motor and drives the airlock/rotor 10. Controller 22 is an automatic controller which operates on an error signal which is determined by the difference between the airlock/rotor's desired speed and the airlock/rotor's actual speed. Reference numeral 27 indicates a speed feedback which is applied to the controller which then acts to increase or decrease the first hydraulic motor's speed. Reference numeral 28 indicates the setpoint which is applied to the controller 22 by the operator so as to run the airlock at the desired speed. The setpoint will be based on the desired rate at which the operator wishes to spread the composted waste.

Alternatively, the controller may operate on the deviation between the actual air system pressure 29 and the air system setpoint pressure 30. The signals inputted to the controller are from transducers well known in the art.

FIG. 2 is a rear view of the hopper 2, conveyor 8, the intermediate supply bin 18, and the airlock/rotor 10. It will be noted that the conveyor 8 is a unidirectional conveyor. Reference numeral 13 indicates the material inlet to the airlock/rotor 10. Reference numeral 12 signifies the air outlet of the airlock/rotor 10.

FIG. 3 is a top view of the composted waste spreading apparatus 1 illustrating the hopper 2, the floor drag chain 6, the flexible air conduits 16 and 17, the relief valve 26, and the airlock/rotor 10. The relief valve is set at 15 psig. The air inlet 11 to the airlock/rotor 10 is illustrated as is the air outlet 12. Diesel engine 24 is shown coupled to an air compressor 15.

Slats 25 are shown as part of the floor drag chain. The slats push material off the bottom of the floor of the hopper 3 and toward an opening 4 in the hopper. Hydraulic motor 5 operates the floor drag chain 6. It may be connected to the floor drag chain 6 by means of a belt or by gearing (not shown). The material from the bottom of tapered hopper 2 is pushed through the opening 4 and into the conveyor 18. The conveyor operated by second hydraulic motor 9 then feeds the composted waste material in a single direction toward the material inlet 13 of the airlock/rotor 10. A hydraulic pump powers the hydraulic motors 5, 9 and 14. The hydraulic pump is not shown in FIG. 3 but is represented diagrammatically by reference numeral 23 in FIG. 4.

FIG. 5 is a cross-sectional view of the airlock/rotor 10 illustrating the carbide-tipped vanes 19 and the air inlet 11. The carbide-tipped portion of the vane is indicated by reference numeral 20 and the material inlet to the rotor is indicated by reference numeral 13.

FIG. 4 is a diagrammatic representation of the manual and automatic control of the hydraulic motors 5, 9 and 14. FIG. 4 further illustrates a 110 horsepower diesel 24 powering both the air conveyor and the hydraulic pump. The hydraulic pump 23 is shown interconnected to the hydraulic motors 5, 9 and 14. FIG. 4 also illustrates the manual controls 7 and 21 for controlling the chain and airlock motors, respectively. If the operator so desires, the airlock/rotor may be set manually by manual control 21 and then the floor drag chain motor 5 may be controlled manually by the manual control 7. The operator needs to control the compost spreading apparatus with the controller so as to handle a difficult material where the composted waste is particularly not free flowing and tends to clog the airlock. The controller is designed to clear the blockage automatically.

FIG. 6 is a diagram of the novel process step. The invention is implemented by the following steps: placing the composted waste into a storage hopper, dragging composted waste from the bottom of the storage hopper into and through an opening in the storage hopper pushing, by means of a unidirectional conveyor, the composted waste out of the storage bin and into a material inlet of an airlock; pumping air into and through the airlock with the air compressor and air conduit; rotating the airlock at a desired speed so as to entrain composted waste passing into the air and, dispersing the composted waste entrained in the air into the environment. The hydraulic motors driving the floor drag chain and the airlock will be controlled by a programmable controller. They may be alternatively controlled by an analog controller which operates proportionally or proportionally plus integral on the deviation (error) between the setpoint and the feedback signal based on air system pressure or airlock/rotor speed. Alternatively, the first and third hydraulic motors controlling the floor drag chain and the airlock, respectively, may be manually controlled.

Although the above description contains many specificities, these should not be construed as limiting the scope of the invention but as merely providing illustrations of some of the ways by which the invention may be implemented. Those skilled in the art will readily recognize that the invention may be modified without departing from the spirit and the scope of the claims which follow hereinbelow.

What is claimed is:

1. A composted waste spreading apparatus comprising:
   a hopper for storing said composted waste which is to be spread;
   said hopper having a floor and an opening therein;
   a first hydraulic motor;
   a drag chain driven by said first hydraulic motor;
   said first hydraulic motor being a variable speed hydraulic motor;
   manual control means for controlling the speed of said first hydraulic motor;
   a conveyor;
   a second hydraulic motor;
   said second hydraulic motor driving said conveyor;
   an airlock;
   said airlock having an air inlet, an air outlet and a material inlet;
   a third hydraulic motor;
   said third hydraulic motor being a variable speed hydraulic motor;
   said third hydraulic motor driving said airlock with a speed sensor;
   an air compressor;
   a first flexible air conduit interconnecting said compressor and said air inlet motor;
   a second flexible air conduit interconnected to said air outlet of said airlock;
   said compressor supplying air to and through said airlock;
   an intermediate composted waste supply bin;
   said drag chain supplying composted waste to and through said opening in said hopper and into said intermediate supply bin;
   said conveyor residing in said intermediate supply bin;
   said conveyor supplying composted waste to said material inlet of said airlock;
   said airlock supplying composted material to the airstream supplied by said compressor resulting in entrainment of said composted material in said airstream;
   and, said second flexible conduit distributing said composted material.

2. A composted waste spreading apparatus as claimed in claim 1 wherein said composted waste includes green waste and municipal waste.

3. A composted waste spreading apparatus as claimed in claim 1 wherein said first hydraulic motor is controlled between 1 and 3 rotations per minute.

4. A composted waste spreading apparatus as claimed in claim 1 wherein said airlock includes a plurality of vanes.

5. A composted waste spreading apparatus as claimed in claim 4 wherein each of said vanes includes a carbide tipped edge.

6. A composted waste spreading apparatus as claimed in claim 3 wherein said conveyor operates at a constant speed.

7. A composted waste spreading apparatus as claimed in claim 6 further comprising means for manually controlling the rotational speed of the airlock.

8. A composted waste spreading apparatus as claimed in in claim 7 wherein the rotational speed of the airlock is increased so as to produce a faster dispersion of composted material.

9. A composted waste spreading apparatus as claimed in claim 7 wherein the rotational speed of the airlock is decreased so as to produce a lesser dispersion of composted material.

10. A composted waste spreading apparatus comprising:
    a hopper for storing said composted waste which is to be spread;
    said hopper having a floor and an opening therein;
    a first hydraulic motor;
    a drag chain driven by said first hydraulic motor;
    said first hydraulic motor being a variable speed hydraulic motor;
    a conveyor;
    a second hydraulic motor;
    said second hydraulic motor driving said conveyor;
    an airlock;
    said airlock having an air inlet, an air outlet, and a material inlet;
    a third hydraulic motor;
    said third hydraulic motor being a variable speed hydraulic motor;
    said third hydraulic motor driving said airlock;
    an air compressor;
    a first flexible air conduit interconnecting said compressor and said air inlet of said airlock;
    a second flexible air conduit interconnected to said air outlet of said airlock;
    said air compressor supplying air to and through said airlock;
    an intermediate composted waste supply bin;
    said drag chain supplying composted waste to and through said opening in said hopper;
    said conveyor supplying composted waste to said material inlet of said airlock; and,
    an automatic controller controls and monitors the rotational speed of said airlock, said conveyor and said chain drive in said hopper.

11. A composted waste spreading apparatus as claimed in claim 10 wherein a desired speed of said airlock is inputed to said automatic controller as a set point, said automatic controller controls said conveyor at a constant rotational speed, said rotational speed of said drag chain is modulated in response to the deviation between the actual speed of said airlock and the setpoint speed of said airlock.

12. A composted waste spreading apparatus as claimed in claim 11 wherein said automatic controller operates on said deviation proportionally or proportionally and integrally.

13. A method of distributing composted waste using a storage hopper having a floor and an opening, a drag chain on said floor of said storage hopper, a conveyor, an intermediate storage bin, an air compressor, an airlock having an air inlet, an air outlet and a material inlet in communication with said intermediate storage bin, and flexible air conduits interconnected between said air compressor and said air inlet to said airlock and said air outlet of said airlock and the environment comprising the steps of:

placing the composted waste into a storage hopper;

dragging said composted waste with a drag chain from the bottom of said storage hopper into and through an opening in said storage hopper and into an intermediate storage bin;

pushing, by means of an unidirectional conveyor, said composted waste out of said intermediate storage bin and into a material inlet of an airlock;

blowing air into and through said airlock with said air compressor and said air conduit;

rotating said airlock at a desired speed so as to entrain composted waste in said air passing tin and through said airlock; and, dispersing said composted waste entrained in said air by means of an air conduit which communicates with the environment.

14. A method of distributing composted waste as claimed in claim 13 further comprising the step of:

driving the speed of said drag chain, said conveyor and said airlock with hydraulic motors.

15. A method of distributing composted waste as claimed in claim 14 further comprising the step of:

controlling the speeds of said hydraulic motors with an automatic controller.

16. A method of distributing a composted waste as claimed in claim 15 wherein said automatic controller is a programmable logic controller.

17. A method of distributing composted waste as claimed in claim 15 wherein said automatic controller is an analog proportional plus integral plus derivative controller.

18. A composted waste spreading apparatus comprising:

a hopper for storing said composted waste which is to be spread;

said hopper having a floor and an opening therein;

a first hydraulic motor;

a drag chain driven by said first hydraulic motor;

said first hydraulic motor being a variable speed hydraulic motor;

a conveyor;

a second hydraulic motor;

said second hydraulic motor driving said conveyor;

an airlock;

said airlock having an air inlet, an air outlet, and a material inlet;

a third hydraulic motor;

said third hydraulic motor being a variable speed hydraulic motor;

said third hydraulic motor driving said air lock;

an air compressor;

a first flexible air conduit interconnecting said compressor and said air inlet of said airlock;

a second flexible air conduit interconnected to said air outlet of said airlock;

said air compressor supplying air to and through said airlock;

an intermediate composted waste supply bin;

said drag chain supplying composted waste to and through said opening in said hopper;

said conveyor supplying composted waste to said material inlet of said airlock; and, an automatic controller controls and monitors the air system pressure.

19. A composted waste spreading apparatus as claimed in claim 18 wherein a desired air system pressure is inputted to said automatic controller as a set point, said automatic controller controls said conveyor at a constant rotational speed, and said rotational speed of said drag chain is modulated in response to the deviation between the actual air system pressure and the setpoint pressure of said air system.

* * * * *